Patented Nov. 22, 1938

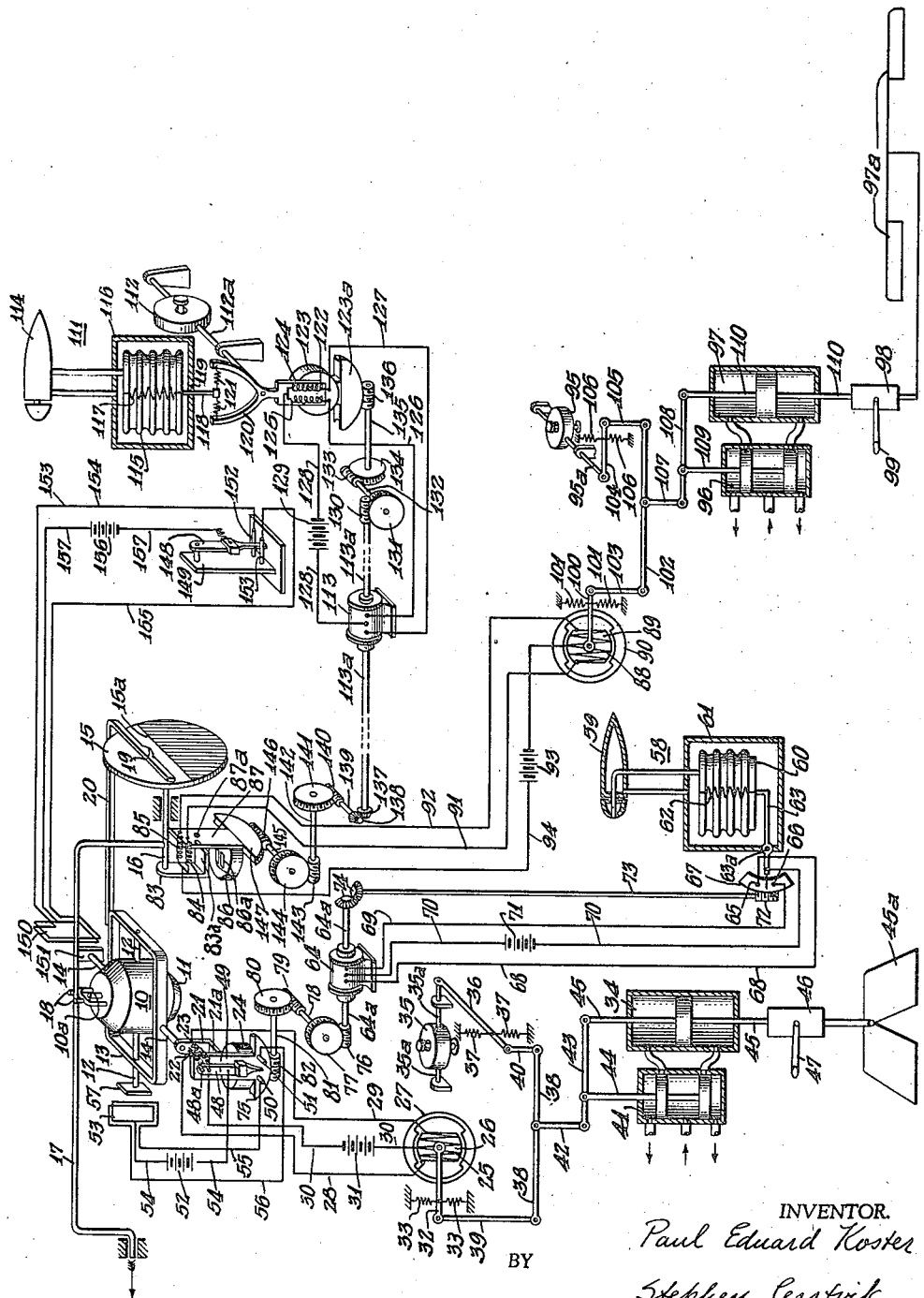

2,137,942

UNITED STATES PATENT OFFICE 2,137,942

ATTITUDE CONTROL MEANS FOR AIRCRAFT

Paul Eduard Köster, Berlin-Siemensstadt, Germany, assignor to Siemens Apparate ünd Maschinen Gesellschaft mit beschränkter Haftung, Berlin, Germany, a corporation of Germany Application January 28, 1938, Serial No. 187,530
In Germany January 30, 1937

16 Claims.  (Cl. 244—76)

This invention relates to attitude control means for aircraft and particularly to automatic attitude control means wherein deviations of an artificial horizon from the true horizontal are automatically corrected.

The invention comprises an improvement in gyroscopic artificial horizons which are adapted, for example, for serving as navigational means for use in steering aircraft either manually or automatically. In gyroscopic devices heretofore proposed for producing an artificial horizon, difficulty has been experienced in maintaining the axis of the gyroscope in the true vertical or in holding the plane of rotation in the true horizontal. The deflections of the gyroscope from the plane to which it is adjusted is attributed in most cases to friction in the bearings of the gyroscopic device. Automatic means have been proposed for readjusting the plane of rotation to the initial correct position but these means have been accurate for flight only in straight and not curved paths. As a result, when the plane follows a curved course, the previously proposed devices, instead of correcting for deviations from the true vertical have caused the gyroscope to assume the apparent vertical as determined by the radius of curvature of the course, the velocity and the inclination of the craft. It is particularly necessary, when in curved flight, to provide an accurate indication of the true horizon.

One of the objects of the present invention is to provide novel stabilizing means for vehicles, such as aircraft.

Another object of the invention is to provide novel means for correcting the deviations of an artificial horizon from the true horizontal and for controlling the attitude of an aircraft relative to said horizon.

An additional object is to provide novel means for preserving the adjustment of an artificial horizon mounted upon an aircraft which means are effective when the craft is following a straight or curved flight path.

A further object is to provide novel means for controlling the precession of an artificial gyroscopic horizon mounted upon aircraft wherein there is an automatic compensation for the flight angle of the craft.

Another object is to provide means of the character described for automatically correcting the deviations of an artificial horizon mounted upon an aircraft and for causing the craft to follow the corrections.

An additional object is to provide novel automatic means for controlling the precessional deviations of a gyroscope from a predetermined position.

Another object is to provide novel automatic stabilizing apparatus for aircraft which is rapid in operation and effective over a wide range of longitudinal and transverse inclinations.

A further object is to provide novel means for producing an accurate and automatically corrected indication of the true horizon when in flight in a curved path.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention, reference being had primarily for this latter purpose to the appended claims.

The single figure constituting the drawing is a schematic illustration of the device.

The form of the invention schematically illustrated in the accompanying drawing, by way of example, is a device for automatically controlling and stabilizing the attitude of aircraft whereby the vertical axis of the craft is continuously compared with the apparent vertical, as established by suitable pendulum means, and means provided for causing said axis to maintain a fixed angular relation to the apparent vertical. The device is effective to correct automatically for precessional deviations of a gyroscopic artificial horizon which acts in cooperation with control surface governing means to cause the vertical axis of the craft to move in accordance with said precessional deviations. If the angular relation of said vertical axis and apparent vertical is altered by said precessional deviations of the gyroscope, automatic means cause the gyroscope to precess in the opposite directions and thus cause the vertical axis of the craft to move therewith until said angular relation is restored. Changes in said angular relation, due to movements of the craft by external forces, automatically produce compensating changes in the control surfaces which also restore the original relation. The automatic apparatus may be connected to the control surfaces by suitable clutch means to maintain a predetermined straight or curved course after the craft has been set thereon, for example, by manual control. It is to be pointed out that the true and apparent verticals coincide when upon a straight, level course but move out of coincidence when upon a curved course.

In the form illustrated in the drawing, the gyroscope 10, having a rotating shaft 10a, constitutes an artificial horizon. The gyroscope may be driven in any suitable manner as by induction motor or air turbine means and may be conventionally mounted in a suitable housing 11 which is supoprted by journals 12, 12 which, in turn, are rotatably mounted upon Cardan ring 13. Journals 14, 14 rigidly attached to said ring are rotatably mounted in ball bearings (not shown) upon the aircraft, said journals being parallel to the transverse axis of the craft.

A visible indication of the position of the aircraft relative to the plane of rotation of gyroscope 10 is provided by an horizon disc 15 rigidly attached to a shaft 16 which is mounted upon the aircraft and which is coaxial with journals 12, 12. Disc 15 is provided with a suitable marking, as line 15a, for indicating the artificial horizon. Shaft 16 is caused to angularly move with journals 12, 12 by means of crank 17 which extends between upwardly extending fingers 18, 18 mounted upon the top portion of the gyroscope housing. The fingers 18, 18 enable the gyroscope to move freely about the transverse axis, i. e., the axis of journals 14, 14, and also to communicate motion about journals 12, 12 to said shaft 16 and disc 15. A dummy aircraft indicator may be represented by a finger 19 which is mounted for angular motion with Cardan ring 13 about the journals 14, 14 by means of arm 20. Dummy 19 is adapted to move across the face of said disc to indicate the position of the aircraft relative to the gyroscopic horizon.

Means are provided for causing the vertical axis of the aircraft to follow precessional movements of the axis of rotation of the gyroscope about the axis of journals 14, 14, i. e., the transverse axis, comprising apparatus for automatically actuating the elevator control surfaces of the craft in accordance with such precession. This apparatus is constituted by means for energizing a rotary magnet in accordance with the amount and direction of said precession. The magnet in turn controls, in cooperation with a gyroscope which precesses in accordance with the angular velocity of the change of attitude about the transverse axis, suitable servo-motor means operatively connected to elevator control surfaces. The means for energizing the rotary magnet is constituted by an angle plate 21 which is connected to the extremity of one of the journals 14, 14 and adapted for rotation therewith. One of the faces of angle plate 21 comprises an air vane 21a which is positioned between a double coil 22 23 and a control element comprising, for example, a nozzle portion 24 mounted upon a movable body to be later explained. Nozzle 24 is connected to a suitable source of air or other gas under pressure. A temperature differential exists between said gas and coils 22, 23. Member 24 forms a double air jet through a double orifice therein (not shown). The coils 22, 23 are in differential connection with a winding 25 upon an armature 26 of a rotary magnet 27. The differential connection is formed by connecting one extremity of each of coils 22, 23 to an extremity of winding 25, as by leads 28, 29. The center of said winding has a common connection, as 30, through an electric energy source 31 to the opposite extremities of the coils 22, 23.

Vane 21a is adapted for controlling the air jets from nozzle member 24 which may be directed upon either coil 22 or 23. Vane 21a may, therefore, control the resistance differential between these coils and therewith the amount and direction of the displacement of armature 26 of magnet 27. An arm 32 drivably connected to said armature is normally held in a centralized position by spring members 33, 33 when the winding 25 is not energized. Rotary magnet 27 with arm 32, for reasons above mentioned, governs the elevator control surfaces by means, for example, of an hydraulic servo-motor 34 in cooperation with a gyroscope 35 which is so mounted upon the shaft by means of shaft 35a that the precession thereof is a function of the angular velocity of the aircraft about the transverse axis, i. e., shaft 35a is mounted parallel to the longitudinal axis of the craft. An arm 36, connected to said shaft, is normally held in an initial position when no precession is acting by means of spring members 37, 37. Arms 32 and 36 are linked to either extremity of a differential lever 38 by means of rods 39 and 40, respectively. Lever 38 in a conventional manner governs a control valve 41 of servo-motor 34 by means of rod 42 which moves lever 43 which, in turn, is pivotally connected to the piston rods 44 and 45 of the control valve and servo-motor, respectively.

In order to permit manual control of elevator control surfaces 45a and to disconnect the servo-motor 34 therefrom, suitable clutch means 46 are provided which may be manually operated, for example, by a hand lever 47. The clutch means are connected to the piston rod 45 of said servo-motor.

The above-described means causes the vertical axis of the aircraft to follow precessional movements of the gyroscope about the transverse axis, i. e., the inclination of the craft's longitudinal axis is altered in accordance with the movements of the gyroscopic plane of rotation about the transverse axis. Means are provided for causing this change in attitude relative to an apparent vertical to produce a compensating turning moment upon the gyroscope which will cause the axis of rotation thereof to precess and to restore said vertical axis to the original angular relation to the apparent vertical. The precession producing means are constituted by a pendulum 48, which establishes an apparent vertical, and is pivoted upon an axis parallel to the transverse axis of the craft, for example, by means of pin 48a which is coaxial with journals 14, 14. The pin 48a is mounted upon the craft and also acts as a pivot pin for a bar 49 which is angularly controlled in a manner to more fully appear hereinafter. Contact pins 50, 51 are mounted upon the movable body 49 and are situated adjacent the lower extremity of pendulum 48 on either side thereof. The erecting or precessing moment is produced when pendulum 48 closes contact with either pin 50 or 51. An electric energy source 52 is connected to the center of a coil 53 and to said pendulum by a lead 54. Contacts 50 and 51 are connected to opposite extremities of said coil by leads 55, 56, respectively. The field of coil 53 is adjacent a permanent magnet 57 rigidly mounted upon journal 12 in such a manner that upon energization of said coil, a motor action is produced which exerts a turning moment upon journal 12 to cause gyroscope 10 to precess about the transverse axis of the mechanism, i. e., about journals 14, 14.

The longitudinal axis of an aircraft in normal level flight at a given air speed may assume a certain flying angle and be slightly inclined to the true horizontal, due, for example, to the aerodynamic qualities of the craft. This inclination is a function of the airspeed. It is pointed out that if pins 50 and 51 were rigidly attached to the aircraft, whenever a sufficiently large flying angle existed, as required by the instantaneous airspeed, the pendulum, which seeks the vertical, would close contact with one of said pins. This would impose a disturbing precession upon the gyroscope horizon and by means of the follow-up mechanism above described would move the elevator control surfaces and alter the correct flying angle. In order to avoid this, the bar 49 is moved about pivot pin 48a in accordance with the airspeed. Consequently, the pins 50, 51 mounted thereon are also moved in accordance with the air speed in such a manner that for a given flying angle, corresponding to the existing air speed, the pendulum is centered between the pins.

The means provided for moving bar 49 in accordance with the air speed comprises an air speed meter 58 which consists of an external tube portion 59 which communicates the pressure acting thereon to a membrane 60 within a housing 61. The movements of said membrane, acting against yielding spring 62, govern an arm 63. Suitable servo-motor means are caused to follow up the movements of said arm comprising, for example, an electric motor 64, having a rotor shaft 64a. Arm 63 is pivotally mounted at 63a upon housing 61 and the outer extremity of the arm moves between contacts 65 and 66 mounted upon a worm wheel segment 67. The motor 64 is conventionally connected to the contacts 65, 66 by leads 68, 69, respectively. Arm 63, by lead 70, is in connection with energy source 71 and with the motor 64. Segment 67 is caused to follow the movements of the motor by means of worm 72 which meshes with said segment and is rotated, by shaft 73 which, in turn, is geared to motor shaft 64a by bevel gears 74, 74.

The rotation of servo-motor 64 is communicated to a worm wheel segment 75 rigidly attached to bar 49, for example, by a reducing worm and wheel arrangement comprising worm 76 upon shaft 64a. Worm 76 meshes with worm wheel 77 which, in turn, is attached by a shaft 78 to worm 79 meshing with wheel 80. Wheel 80 is mounted upon shaft 81 upon which the worm 82 also is mounted and which meshes with wheel segment 75 to move bar 49 pivotally about pin 48a.

For reasons above mentioned, when the craft is in level flight, a flying angle may exist which will cause the longitudinal axis of the aircraft to be inclined to the horizontal. If nozzle member 24 were rigidly attached to the aircraft, it would be displaced relative to the true vertical an amount corresponding to the flying angle. This would permit an airstream from one of the double nozzles upon said member to flow past vane 21a and impinge upon one of the coils 22, 23 and thus to actuate the apparatus governing the elevator control surfaces and to disturb the equilibrium of the entire apparatus. This is avoided by displacing said nozzle in accordance with the air speed and, therefore, in accordance with the flying angle. This is accomplished by mounting the nozzle member 24 upon bar 49 which is angularly displaced in the manner above described by the air speed meter 58.

Means are provided for causing the vertical axis of the aircraft to follow the precessional movements of the gyroscopic axis of rotation about the longitudinal axis of the craft, comprising apparatus for automatically moving the aileron control surfaces in accordance with said precession. This apparatus is constituted by means of energizing a rotary magnet in accordance with amount and direction of the precession. The magnet, in turn, controls, in cooperation with a gyroscope, suitable servo-motor means drivably connected to the ailerons. The cooperating gyroscope causes the servo-motor to respond to the angular velocity of the change of attitude about the longitudinal axis. The means for energizing the rotary magnet is constituted by an angle plate 83 which is operatively connected to shaft 16 and adapted for rotation therewith. One of the faces of angle plate 83 comprises a vane 83a which is positioned between a double coil member 84, 85 and a control element comprising an air nozzle member 86 which is mounted upon a movable body comprising a bar portion 87 which is pivotally connected to the aircraft by means of a pin 87a. The angular position of bar 87 is controlled in a manner to be later set forth. Member 86 forms a double air jet by means of a double orifice 86a, 86a formed thereon. Member 86 may be connected to a source of air or gas under pressure in a manner similar to nozzle 24. The coils 84, 85 are in differential connection with a winding 88 upon an armature 89 of a rotary magnet 90. The differential connection is formed in a manner similar to that of the previously described rotary magnet by connecting one extremity of each of the coils 84, 85 to an extremity of winding 88 by leads 91, 92, respectively, and by connecting the center of said winding through energy source 93 to the opposite extremities of said coils by lead 94.

Rotary magnet 90 in cooperation with gyroscope 95 mounted upon shaft 95a governs a control valve 96, for example, of an hydraulic servo-motor 97 which, in turn, is operatively connected to the aileron control surfaces 97a through a suitable clutch mechanism 98 which may be disengaged manually by lever 99. The gyroscope is so mounted that the precession thereof is a function of the angular velocity of the craft about its longitudinal axis. An arm 100 drivably attached to armature 89 and normally held in a centralized position by opposed spring members 101, 101, is pivotally linked to one extremity of the control valve differential lever 102 by means of a rod 103. To the opposite extremity of said lever is communicated the precessional movements of gyroscope 95 by means of arm 104 and pivotally interconnected rod 105. Arm 104 is normally held in a centralized position, when no precessional moment is acting, by opposed springs 106, 106. A rod 107 pivotally links the lever 102 to the contol arm 108 in a conventional manner which in turn is in pivotal connection with the piston rods 109 and 110 of the control valve and servo-motor respectively. Piston rod 110 is in operative connection with the aileron surfaces through the above-mentioned clutch means 98.

Vane 83a which follows the movements of the gyroscopic axis of rotation about the longitudinal axis, i. e., the axis of journals 12, 12 is movable relative to nozzle portion 86 and is adapted for governing the amount and direction of the displacement of piston 110 of servo-motor 97 in a manner similar to that by which the movements of vane 21a, relative to member 24, govern servo-motor 34.

When following a curved horizontal course, it is known that an aircraft, in order to maintain stability, must assume a transverse inclination. This transverse inclination will be of the proper amount when the vertical axis of the aircraft approximately coincides with the apparent vertical which is determined by the product of the angular velocity of the craft about the vertical axis and the air speed. The centrifugal force acting upon suitable pendulum means will establish the apparent vertical. This pendulum is pivoted about an axis parallel to the longitudinal axis of the aircraft. In a manner to be hereinafter described, the vertical axis of th aircraft is compared with the apparent vertical in correcting for the gyroscopic precession from the true vertical about the longitudinal axis, and in stabilizing the craft in the inclined position. It is pointed out that, if the control element or nozzle member 86 were rigidly attached to the aircraft, the transverse inclination of the craft would cause said member to move relative to the vane 83a, which is governed by gyroscope 10, and thus allow the air jets from said member to impinge upon one of the coils 84 or 85 and to alter the stability of the craft by actuating the servo-motor and the ailerons. In order to avoid this means are provided for angularly displacing the nozzle member 86 in such a manner that the orifices 86a therein will remain beneath the vane 83a, when the craft is in the transversely inclined position, so long as the vertical axis of the craft maintains the correct angular relation with the apparent vertical. Therefore, the aileron controlling servo-motor will remain inoperative until precession of the gyroscope or external forces alter the stability of the craft in the inclined position.

As above mentioned, the apparent vertical, when the craft is upon a curved course, may be determined by the product of the air speed and the angular velocity of the craft about its vertical axis. Therefore, in order to angularly compensate for the position of nozzle member 86 to cause the same to remain beneath vane 83a when the craft is transversely inclined, means are provided which are responsive to said air speed and angular velocity to move the nozzle 86 relative to the vane 83a. The means comprise an air speed meter 111 which acting in cooperation with a gyroscope 112 governs a servo-motor 113 which, in turn, positions the bar 87 upon which is mounted member 86.

The air speed meter 111 comprises an external tube portion 114 which communicates the pressure acting thereon to a membrane 115 within a housing 116. The movements of said membrane acting against a resilient spring member 117 govern the longitudinal motion of an arm 118 which is adapted for reciprocating movement in bore 119 of said housing. The gyroscope 112 mounted upon shaft 112a acts in cooperation with the meter 111 so that the angular displacement of a Y-shaped portion 120, rigidly attached at the center thereof to an extremity of said shaft, is a function of the product of the air speed and angular velocity about the vertical aircraft axis. In order that the gyroscope 112 precess in accordance with said velocity the shaft 112a must be mounted parallel to the transverse axis of the craft with the axis of rotation in the horizontal. The arm 118 is adapted to extend between the arms of the Y-shaped portion 120 and is resiliently connected thereto, for example, by means of opposed spring members 121, 121. The arm 118 is so disposed relative to portion 120 that as the air speed increases, the resistance to the precession of gyroscope 112 decreases.

In order to amplify the movements of portion 120 and thus to amplify the product of the air speed and angular velocity about the vertical axis, the servo-motor 113 is provided. The control means for this motor comprise a vane 122, which forms the lower arm of Y-shaped member 120, and which is interposed between an air nozzle member 123 and a double coil 124, 125. Member 123 is mounted upon a worm wheel segment 123a and adapted for movement about the center of said segment. The double coil, in turn, is in differential connection with servo-motor 113 by means of leads 126, 127 and 128. The energy source 129 is connected in the central lead 128 in a conventional manner. The movements of motor 113 are communicated to segment 123a and thus to nozzle 123 to cause said member to follow vane 122 and cause the motor to cease operation when it has moved a proper amount, for example, by means of worm and wheel 130, 131 upon shafts 113a, 132, respectively, and worm and wheel 133, 134 upon shafts 132, 135, respectively. A worm 136 upon the latter shaft meshes with the worm wheel segment 123a to move the nozzle member 123 as above mentioned.

The movements of servo-motor 113 are finally communicated to the nozzle 86, for example, by means of a reducing arrangement comprising bevel gears 137, 138 upon shafts 113a and 139, respectively, a worm and wheel 140, 141 upon shafts 139, 142, respectively, and an additional worm and wheel 143, 144 upon shafts 142, 145, respectively. A worm 146 upon the latter shaft meshes with a worm wheel segment 147 which is rigidly attached to bar 87 and to nozzle member 86. Since bar 87, as hereinbefore explained, is pivotally mounted by means of pin 87a, the worm 146 and segment 147 are adapted for angularly displacing said bar and nozzle about said pin.

In order to provide the above-mentioned apparent vertical to which the position of the vertical axis of the craft may be compared as it moves about the longitudinal axis of said craft, a pendulum 148 is pivotally mounted upon a support 149 rigidly attached to the craft. The pivot axis of the pendulum is parallel to the longitudinal axis of the craft. Means are provided for correcting deviations of said vertical axis from the correct angular relation to the apparent vertical comprising, for example, a coil 150 which is energized upon said deviation to produce a motor action upon a permanent magnet 151 adjacent thereto and rigidly attached to the outer extremity of one of the journals 14 such that a corrective turning moment will be exerted upon the journal to cause the gyroscope 10 to precess and to change the attitude of the craft accordingly. Contact pins 152, 153 are mounted upon support 149 and are so situated relative to pendulum 148 that the pendulum is centered therebetween when the aircraft's vertical axis and the apparent vertical are in proper relation. It is unnecessary to displace pins 152, 153 relative to said pendulum in order to compensate for transverse inclination of the craft when upon a curved course, because the centrifugal forces acting cause the pendulum to be centered between said pins if the vertical axis of the craft is in proper relation to the apparent vertical as established by the pendulum. Pins 152 and 153 are connected to opposite extremities of coil 150 by leads 154, 155, respectively, and the pendulum is connected to a source of electric energy 156 and thence to the center of said coil by a lead 157.

In operation, the apparatus performs two main functions, namely, the correction of precessional deviations of the artificial horizon from the true horizontal, and the stabilization of the aircraft relative to the artificial horizon when following both straight and curved courses. It should be remembered that the true and apparent verticals coincide when upon a straight course but the latter becomes angularly displaced from the former when upon a curved course. Assume that the craft is upon a straight level course at a given air speed and that the gyroscopic plane of rotation is in the true horizontal. Also assume that no flying angle exists, i. e., that the longitudinal axis of the craft is in the true horizontal and that the automatic apparatus has been connected to the control surfaces by the clutches 46 and 98. Suppose, for example, that due to bearing friction the gyroscope 10 precesses in a counter-clockwise direction about the transverse axis of the Cardan ring mounting, i. e., the axis of journals 14, 14. This movement of the gyroscopic axis of rotation will be followed by a corresponding movement at a corresponding angular velocity of the vertical axis of the aircraft. Dummy craft 19 will also be moved in accordance with the precession. Vane 21a will move relative to nozzle 24. An air jet will impinge upon coil 22 which will alter the resistance thereof and cause an electric current to flow to energize rotary magnet 27 and thus to actuate the servo-motor 34 which, in turn, will move the elevator control surfaces. The gyroscope 35 will then precess to further influence motor 34 in accordance with the angular velocity of this change in attitude about the transverse axis. As the aircraft angularly moves about said axis in accordance with the gyroscopic precession the nozzle 24 attempts to regain the position beneath vane 21a. However, before this occurs, the pendulum 48, which has previously been centered between pins 50 and 51, will contact pin 50 to energize coil 53 and produce a compensating turning moment upon the gyroscope causing the same to precess in a direction opposite to the first precession. Consequently, vane 21a will move to expose coil 23 to the jet from nozzle 24 and a reversal of the movement of the elevator control surfaces will occur according to the above process and the vertical axis of the craft will be moved correspondingly until the original relation between said vertical axis and the apparent vertical is regained. When this occurs, the pendulum 48 again will be centered between the contacts 50, 51 and dummy aircraft 19 upon the visual indicator will be in the initial correct position.

If, instead of the gyroscope precessing from the true horizontal, the attitude of the aircraft due to external forces is altered relative to said gyroscope and apparent vertical, the apparatus will function as an automatic stabilizer. Suppose, for example, that the aircraft is displaced in a counter-clockwise direction about its transverse axis. Nozzle 24 will move from beneath vane 21a, an air jet will strike coil 23, and, by means of the above-explained servo-motor mechanism, a compensating displacement of the elevator control surfaces will be produced such that the craft will angularly move in a clockwise direction about said transverse axis. Gyroscope 35 will further influence the servo-motor as a function of the angular velocity of said attitude change. However, the pendulum 48 will have contacted pin 50 to cause the gyroscope 10 to precess, also in a clockwise direction. Consequently, the vertical axis of the craft and the gyroscopic axis of rotation will be moving in the same direction about the transverse axis of the craft. The clockwise precession of the gyroscope will cease when said vertical axis has regained the original position relative to the apparent vertical as established by the pendulum 48, i. e., when said pendulum is centered between contacts 50, 51. However, the clockwise motion of the vertical axis of the craft will not instantly cease but will continue in the attempt to restore the nozzle 24 beneath the vane 21a which moved with the precession of gyroscope 10. Said clockwise motion will next cause pendulum 48 to contact pin 51 and to produce a counter-clockwise precession in said gyroscope which, in turn, by exposing coil 22 to an air jet from nozzle 24 will again alter the control surfaces through the servo-motor 34 to cause the vertical axis of the craft to move in a counter-clockwise direction. This process progressively reduces the steps which said vertical axis must take in order to follow the precessing axis of rotation until eventually said axis of rotation is in the true vertical and said vertical axis has regained the original angular position relative to the apparent vertical. Consequently, the aircraft regains the initial attitude and the artificial horizon, after successive precessional movements, regains the true horizontal.

Air speed meter 58 compensates for any flying angle which may exist when following a level flight path. In order to prevent the slight displacement due to the flying angle from moving nozzle 24 relative to vane 21a, and actuating the elevator control servo-motor, and also to prevent a similar displacement from moving pins 50, 51 relative to pendulum 48 and energizing coil 53, the air speed meter 58 moves said nozzle and pins by servo-motor 64 in accordance with the flying angle. This movement pivots bar 49 about pin 48a and centers the pendulum 48 relative to the pins 50, 51 and moves nozzle 24 beneath vane 21a.

Assuming that the aircraft is still upon a straight, horizontal course, a precession of the gyroscope about the longitudinal axis, i. e., the axis of journals 12, 12, will move vane 83a and expose one of the coils 84, 85 to an air jet from nozzle 86. This coil exposure will energize the rotary magnet 90 and cause a corresponding displacement of piston 110 of servo-motor 97 which, in turn, will alter the aileron control surfaces to cause the vertical axis of the craft to move in accordance with said precession. Gyroscope 95 differentially linked to the servo-motor will precess as a function of the angular velocity of this attitude change and will influence said motor accordingly. The change in attitude will alter the position of said vertical axis relative to the apparent vertical, as established by pendulum 148, and will cause the pendulum to contact one of the pins 152 or 153 which, in turn, will energize coil 150. Coil 150 will exert a compensating turning moment upon the gyroscope 10 to cause the same to reverse in precession toward the true vertical. The reverse motion of the gyroscope and therewith vane 83a will expose the opposite coil to an air jet from nozzle 86 and thus by the servo-motor alter the ailerons to cause the vertical axis of the craft to follow therewith in the reverse direction to restore the original relation between said axis and the apparent vertical. This precession will cease upon the restoration of said relation and the gyroscope will be in the true vertical.

If it is desired to hold the craft, for example, upon a curved horizontal course, the craft is manually adjusted to said course and the clutch means 46, 98, to the automatic apparatus, are engaged. As above pointed out, the apparent vertical, due to centrifugal forces occurring, becomes angularly displaced from the true vertical when upon a curved course. A transverse inclination of the aircraft occurs. The reference control element or nozzle 86 is angularly displaced in accordance with said centrifugal forces by means of the air speed meter 111, the gyroscope 112 and the follow-up servo-motor 113. The servo-motor, in turn, moves bar 87 upon which nozzle 86 is mounted in such a manner that the transverse inclination of the craft is compensated for, and the vertical axis of the craft is permitted to follow the apparent vertical and to retain its angular position relative thereto without disturbing the gyroscopic axis of rotation. Consequently, the precessional deviations of the gyroscope will be referred to the displaced control element 86 which has not moved relative to its initial position. As a result, said precessional deviations are reflected by corresponding movements of the vertical axis of the craft from the new position. The process by which such deviation is corrected is similar to that outlined above when the apparent and the true vertical coincide. Changes in attitude of the craft, when transversely inclined, i. e., changes in the angular relation of the vertical axis of the craft and the apparent vertical, which are caused by external forces also are corrected in the manner similar to that outlined when the true and apparent vertical coincide.

There is thus provided a novel control apparatus for vehicles such as aircraft which is particularly adapted for automatically stabilizing an aircraft and the gyroscopic artificial horizon associated therewith. The device is effective to correct for precessional deviations of the gyroscope when the craft is upon both straight and curved courses and also is effective to stabilize the aircraft when upon a straight course and when transversely inclined in following a curved course. Automatic means are provided for preventing changes in flying angle, due to changes in air speed, from actuating the stabilizing means. The apparatus is rapid in operation and effective over a wide range of longitudinal and transverse inclinations.

Although only one embodiment has been illustrated and described in detail, it is to be expressly understood that the invention is not limited thereto. For example, in the form shown, the aircraft control surfaces are governed by hydraulic motors.

However, suitable electric motors may be substituted. Also the hydraulic servo-motors, in the form shown, are governed by rotary magnets which are energized by a differential current which flows in accordance with an air jet directed upon a differential coil arrangement. For this construction may be substituted a suitable synchronous motor arrangement which communicates the relative movements of the gyroscope to the servo-motor control device. Furthermore, in the embodiment illustrated, the control element 24, comprising an air nozzle, and the contact pins 50, 51 are attached to a common mounting and angularly displaced simultaneously therewith by common means. However, said element and pins may be separately mounted and moved by separate means, provided they are moved as a function of the air speed. Various changes may also be made in the design and arrangement of parts illustrated without departing from the spirit and scope of the invention, as the same will now be understood by those skilled in the art. For a definition of the limits of the invention, reference will be had primarily to the appended claims.

What is claimed is:

1. In apparatus for controlling an artificial horizon and for maintaining a predetermined inclination of an aircraft, a gyroscope, a body displaceably mounted upon said craft, means for controlling the longitudinal inclination of said craft in accordance with the movement of said body relative to said gyroscope, means for precessing said gyroscope when said body moves relative to the apparent vertical, means for displacing said body in response to the air speed, a second body displaceably mounted upon said craft, means for controlling the transverse inclination of said craft in accordance with the movement of said second body relative to said gyroscope, means for precessing said gyroscope upon the movement of said craft relative to the apparent vertical, and means for displacing said second body in response to the air speed and the angular velocity of said craft about the vertical axis thereof.

2. In apparatus of the class described, a gyroscope in Cardan ring suspension upon an aircraft, a movable body, means for moving said body in response to the flying angle of said craft, means for controlling said craft in accordance with the movements of said gyroscope relative to said body, means for precessing said gyroscope in response to variations of the position of said body relative to the apparent vertical, a second movable body, means for controlling said craft in response to movements of said gyroscope relative to said second body, means for precessing said gyroscope in response to variations in position of said craft relative to the apparent vertical, and means for moving said second body in response to centrifugal forces acting when in curved flight.

3. In artificial horizon apparatus for maintaining a predetermined inclination of an aircraft, control surfaces for said craft, a gyroscope having a normally vertical axis of rotation, a movable body mounted upon said craft, means for moving control surfaces of said craft in accordance with the movement of said gyroscope relative to said body, pendulum means upon said craft, means for precessing said gyrocscope in accordance with the angular variations of said body relative to said pendulum means, an air speed meter, means for moving said body in accordance with the indications of said meter, a second movable body upon said craft means for moving control surfaces in accordance with the movement of said gyroscope relative to said second body, means for indicating the angular velocity of said craft about the vertical axis thereof, and means for moving said second body in accordance with the product of the indication of said air speed meter and said angular velocity indicating means.

4. In artifical horizon apparatus for maintaining a predetermined inclination of an aircraft having control surfaces, a gyroscope having a normally vertical axis of rotation, a movable body mounted upon said craft, means for moving control surfaces of said craft as a function of the movement of said gyroscope relative to said body, means for precessing said gyroscope in accordance with the angular variations of said body relative to the apparent vertical, means for moving said body as a function of the air speed, a second movable body upon said craft, means for moving control surfaces of said craft in response to the movement of said gyroscope relative to said second body, means for precessing said gyroscope in accordance with the angular variations of said craft relative to the apparent vertical, and means for moving said second body in accordance with the product of the air speed and the angular velocity of said craft about the vertical axis thereof.

5. In apparatus for the control of aircraft substantially as described, attitude control means for said craft, a gyroscope having a normally vertical axis of rotation, a Cardan ring mounting for said gyroscope having a transverse and a longitudinal shaft, a pendulum mounted upon said craft coaxial with said transverse shaft, a second pendulum mounted upon said craft coaxial with said longitudinal shaft, a body movably mounted upon said craft, means for displacing said body in accordance with the air speed, means for governing said attitude control means in response to the movements of said body about said transverse axis relative to said gyroscope, means for exerting a precessing moment upon said gyroscope when said body moves relative to said first pendulum, a second body movably mounted upon said craft, means for governing said attitude control means in response to the movements of said second body about said longitudinal axis relative to said gyroscope, means for exerting a precessing moment upon said gyroscope when said craft moves relative to said second pendulum, and means for displacing said second body in response to the air speed and angular velocity of said craft about the vertical axis thereof.

6. In artificial horizon apparatus for maintaining a predetermined inclination of an aircraft, control surfaces for said craft, a gyroscope having a normally vertical axis of rotation, a movable body mounted upon said craft, means for moving control surfaces of said craft in accordance with the precession of said gyroscope relative to said body, pendulum means mounted upon said craft, means for precessing said gyroscope in a direction opposite to the direction of movement of said body relative to said pendulum, and means for displacing said body in accordance with the air speed.

7. In artificial horizon apparatus for maintaining a predetermined inclination of an aircraft, control surfaces for said craft, a gyroscope having an axis of rotation initially adjusted to the true vertical, a movable body mounted upon said craft, means for moving control surfaces of said craft in accordance with the precession of said gyroscope relative to said body, pendulum means mounted upon said craft, means for precessing said gyroscope in a direcion opposite to the direction of movement of said craft relative to said pendulum, and means for displacing said body in accordance with the air speed and the angular velocity of said craft about the vertical axis thereof.

8. In apparatus for the control of aircraft substantially as described, a gyroscope mounted upon said craft, control surfaces for said craft, control element means displaceable relative to said craft, means for governing said control surfaces in accordance with the precession of said gyroscope relative to said element, pendulum means mounted upon said craft, means for precessing said gyroscope in a direction opposite to the direction of movement of said element means relative to said pendulum, and means for angularly displacing said element in accordance with the air speed.

9. In apparatus for the control of aircraft substantially as described, a gyroscope, a body displaceably mounted upon said craft, coil means upon said body, said coil means in differential connection with electric motor means, means mounted upon said body for directing a jet of gaseous substance upon said coil means, said gaseous substance being at a temperature different from that of the coil means, vane means governed by said gyroscope interposed between said jet directing means and said coil means, means for controlling the longitudinal inclination of said craft in accordance with the current flowing in said coil means, means for exerting a turning moment upon said gyroscope upon the movement of said body relative to the apparent vertical, means for displacing said body in response to the air speed, a second body displaceably mounted upon said craft, coil means upon said second body, said coil means in differential connection with electric motor means, means mounted upon said second body for directing a jet of gaseous substance upon the latter coil means, said gaseous substance being at a temperature different from that of the latter coil means, second vane means governed by said gyroscope interposed between the latter jet directing means and the latter coil means, means for controlling the transverse inclination of said craft in accordance with the current flowing in said latter coil means, means for precessing said gyroscope upon the movement of said craft relative to the apparent vertical, and means for displacing said second body in accordance with the air speed and the angular velocity of said craft about the vertical axis thereof.

10. In apparatus for air control substantially as described, a gyroscope, a body displaceably mounted upon said craft, means for displacing said body in response to the air speed, means for controlling the longitudinal inclination of said craft in accordance with the movements of said gyroscope relative to said body, means for precessing said gyroscope when said body moves relative to the apparent vertical in a direction opposite to the direction of movement of said body relative to the apparent vertical, a second body displaceably mounted upon said craft, means for displacing said second body in accordance with the air speed and the angular velocity of said craft about the vertical axis thereof, means for controlling the transverse inclination of said craft in accordance with the movements of said gyroscope relative to said second body, and means for precessing said gyroscope when said craft moves relative to the apparent vertical in a direction opposite to the direction of movement of said craft relative to the apparent vertical.

11. In apparatus for aircraft control substantially as described, a gyroscope in Cardan ring suspension having a normally vertical axis of rotation, means for exerting turning moments upon said gyroscope suspension to produce precession of said gyroscope, a body displaceably mounted upon said craft, means for displacing said body in response to the air speed, pendulum means mounted upon said craft adjacent said body, said pendulum means being responsive to inclinations of said body relative to the apparent vertical, an electric connection between said pendulum means and said precession producing means for actuating said precession producing means upon inclination of said body relative to said pendulum means, means for controlling the longitudinal inclination of said craft in accordance with the movements of said gyroscope elative to said body, a second body displaceably mounted upon said craft, means for displacing said body in accordance with the centrifugal forces acting when in curved flight, second pendulum means mounted upon said craft, said pendulum means being responsive to inclinations of said craft relative to the apparent vertical, an electric connection between said pendulum means and said precession producing means for actuating said precession means upon inclination of said craft relative to said pendulum means, and means for controlling the transverse inclination of said craft in accordance with the movements of said gyroscope relative to said second body.

12. In apparatus for controlling an artificial horizon and for maintaining a predetermined inclination of an aircraft, a gyroscope, a body displaceably mounted upon said craft, means for controlling the longitudinal inclination of said craft in accordance with the movement of said body relative to said gyroscope, and means for precessing said gyroscope when said body moves relative to the apparent vertical.

13. In apparatus for controlling an artificial horizon and for maintaining a predetermined inclination of an aircraft, a gyroscope, a body displaceably mounted upon said craft, means for controlling the longitudinal inclination of said craft in accordance with the movement of said body relative to said gyroscope, means for precessing said gyroscope when said body moves relative to the apparent vertical, and means for displacing said body in response to the air speed.

14. In apparatus for controlling an artificial horizon and for maintaining a predetermined inclination of an aircraft, a gyroscope, a body displaceably mounted upon said craft, means for controlling the transverse inclination of said craft in accordance with the movement of said body relative to said gyroscope, means for precessing said gyroscope upon the movement of said craft relative to the apparent vertical, and means for displacing said second body in response to the air speed and the angular velocity of said craft about the vertical axis thereof.

15. In apparatus of the class described, a gyroscope in a Cardan suspension upon an aircraft, a movable body, means for moving said body in response to the flying angle of said craft, means for controlling said craft in accordance with the movements of said gyroscope relative to said body, and means for precessing said gyroscope in response to variations of the position of said body relative to the apparent vertical.

16. In apparatus of the class described, a gyroscope in a Cardan suspension upon an aircraft, a movable body, means for controlling said craft in response to the movements of said gyroscope relative to said body, means for precessing said gyroscope in response to variations in the position of said craft relative to the apparent vertical, and means for moving said body in response to centrifugal forces acting when in curved flight.

PAUL EDUARD KÖSTER.